Jan. 2, 1962 H. A. SCHNEIDER 3,015,444
DIGITAL DATA GENERATOR CIRCUITS FOR COMPUTER TESTING
Filed Nov. 30, 1954 4 Sheets-Sheet 4

INVENTOR
H. A. SCHNEIDER
BY
ATTORNEY

United States Patent Office 3,015,444
Patented Jan. 2, 1962

1

3,015,444
DIGITAL DATA GENERATOR CIRCUITS FOR COMPUTER TESTING
Herbert A. Schneider, Coytesville, N.J., assignor to Bell Telephone Laboratories, Inc., New York, N.Y., a corporation of New York
Filed Nov. 30, 1954, Ser. No. 471,994
7 Claims. (Cl. 235—164)

This invention relates to electrical circuits and more particularly to such circuits for generating mathematical functions.

In the scanning of aircraft by radar, digital computers are employed which receive information indicating the present position of the aircraft and then, on the basis of present and past information, predict the next position of the aircraft, thereby constantly tracking the aircraft and enabling guns to be trained on the next computed position of the aircraft. It is of course essential that the equipment be in constant readiness, yet because of its complexity and the high speed of operation, it has been very difficult in the past to test such equipment to assure that it is in working order. One priorly known way of testing has been to set up, manually, test data and feed this data into the machine, the test data being chosen for a problem that has been priorly worked out. This, however, is a very laborious task and does not take into effect the full manner of operation of the machine, as the tracking is dynamic, occurring at successive time intervals, whereas the tests have usually been static, providing data for a specific problem only.

The information applied to the computer during the normal operation of the radar system comprises a set of three equations, which are functions of time, and which, in some coordinate array, define a point in space; either Cartesian or polar coordinates may of course be utilized. Properly to provide a constant test of the machine's operability, it is therefore necessary to apply to the machine time functions indicating a test flight pattern of an aircraft which it is assumed is being scanned.

In order fully to utilize repetitive testing of the radar equipment by data fed into it, it is necessary that the equipment utilized to generate the test functions and data be compact and of small enough size that it can easily be mounted directly with the radar computer itself. Accordingly, the equipment for generating test functions should utilize components small in size and of a minimum complexity.

It is a general object of this invention to provide an improved function generator capable of generating functions variable in time, the functions being of simple or higher orders.

It is a further object of this invention to facilitate the testing of special purpose computers and particularly of radar computers for tracking aircraft or other moving bodies.

It is another object of this invention to generate functions for the testing of radar equipment by circuitry compact and small enough to be mounted together with the radar computer as to form an integral component thereof, thereby obviating the necessity for considerable extra equipment or the manual setting up of test data for the radar equipment.

It is still another object of this invention to enable the constant testing, by functions variable in time, of digital computers concerned with timed information inputs, whereby the computer is always known to be in a ready state to receive and operate on actual data.

In accordance with this invention, three different functions of time are generated, by circuitry in accordance with aspects of the invention, and these functions are applied to the apparatus being tested. By generating the predetermined digitalized time series, which represent the flight coordinates of a target in space, accurate and repetitive testing of the computer of the radar system is attained. For purposes of illustration, a simple test flight pattern can be assumed, such as a parabolic flight pattern in the horizontal plane. The flight pattern is defined by the Cartesian coordinates X, Y, and Z indicating successive points in time along the path of the aircraft. In this specific example, radar contact will be assumed at time $t=0$ when the target is at $$X_0=51,\ Y_0=-5,\ \text{and}\ Z_0=7 \tag{1}$$

where 51, −5, and 7 are expressed in terms of the basic unit of distance of the system. In exemplary radar systems this unit may be of the order of 25 or 50 yards, though of course the actual physical value of this unit is not important to the computations being tested.

For this specific example it is further assumed that the target shall "fly" at constant altitude $$Z(t)=7 \tag{2}$$

and will proceed at a constant rate towards and beyond the origin in the positive Y direction in such a manner as to be at minimum distance from the origin when $t=5$; therefore $$Y(t)=t-5 \tag{3}$$

Further in this example it is assumed that the target approaches and recedes from the origin in the X direction in such a manner as to reverse its direction when closest to the origin; i.e., $$X(t)=2(t-5)^2+1 \tag{4a}$$
$$=2t^2-20t+51 \tag{4b}$$

In a specific embodiment of this invention, the function $X(t)$ given by Equation 4b is generated by employing a word generator which provides the coefficients 2, 20, and 51 and combinations of accumulators and binary adders. An accumulator is a logical circuit which adds to the present input the most recent output; the summation appearing at the output of an accumulator circuit is therefore that of the accumulation of prior inputs. By employing these circuits any power series can be generated very rapidly.

For higher order functions the word generator provides not only the coefficient of the final output function but also a compensating or difference factor utilized in preventing extraneous terms appearing in the output of the function generator circuit.

It is a feature of this invention that functions be generated by employing accumulators and adders in combinations, the coefficients of the various terms of the desired function together with compensating factors, if necessary, being applied to various of the accumulators and adders of the circuit.

Further it is a feature of this invention that a term in a function be generated by taking the summation of the differences between the terms of a series representing the desired order of power of the variable, the desired coefficient being applied to this series.

These and other objects of this invention can be seen from consideration of the following detailed description and the accompanying drawing, in which.

Figure 1:
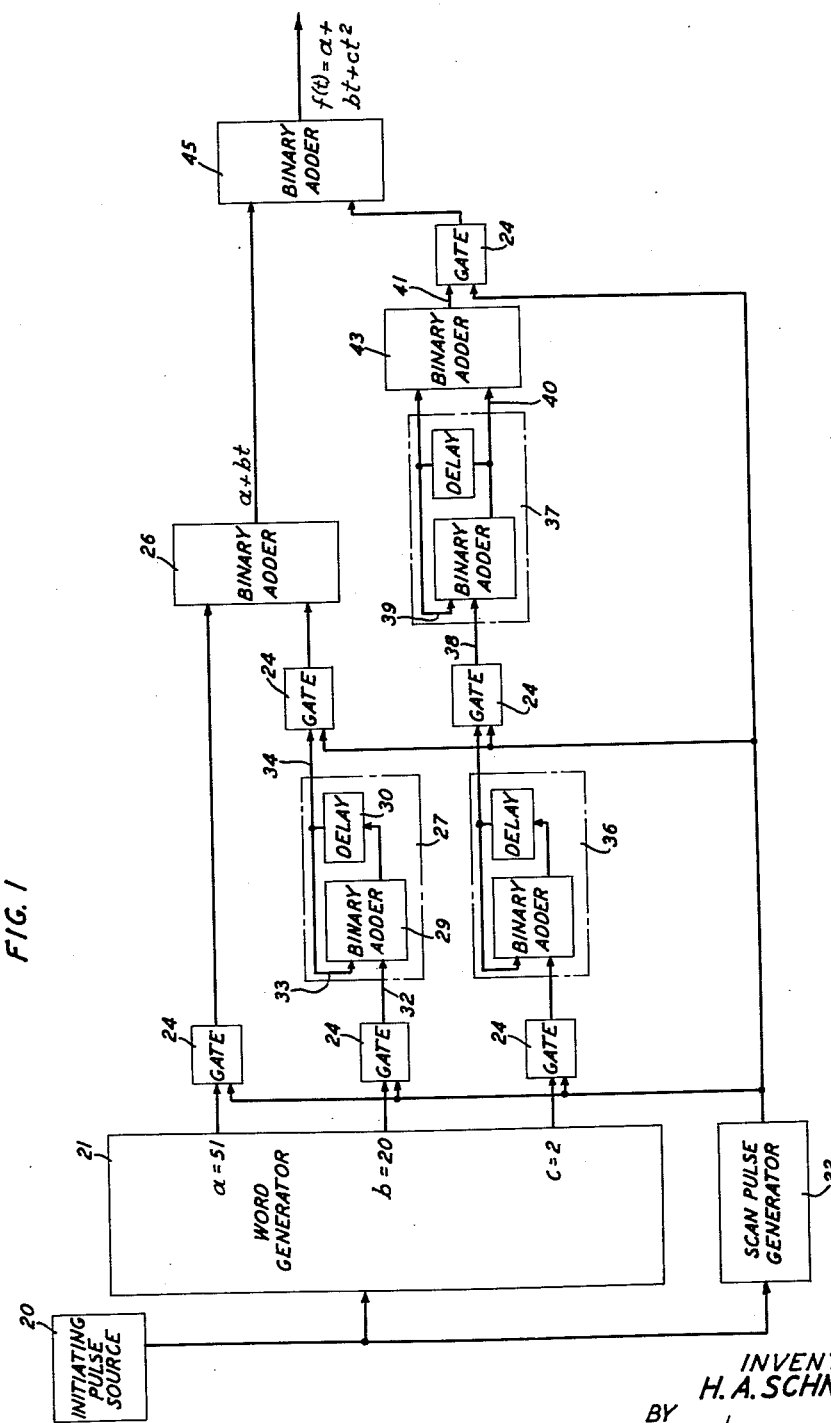
FIG. 1 is a block diagram representation of one specific illustrative embodiment of this invention for generating a function $f(t)=a+bt+ct^2$ to be employed in the repetitive testing of radar computer equipment.

Turning now to the drawing, the specific illustrative embodiment depicted in FIG. 1 comprises a function generator for generating the function $$f(t)=a+bt+ct^2 \qquad (5)$$

and specifically in our exemplary problem $$f(t)=51-20t+2t^2 \qquad (6)$$

Figure 2:
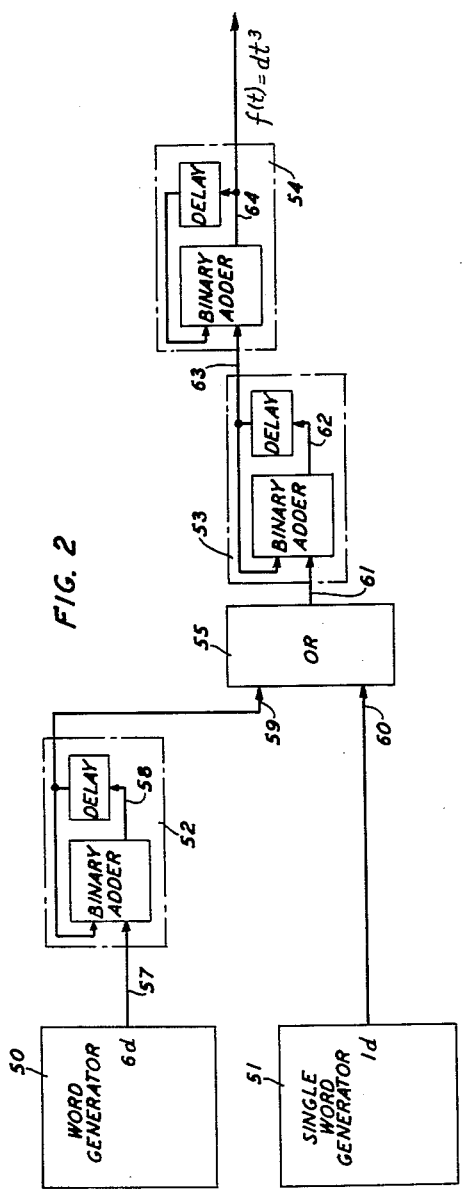
FIG. 2 is a block diagram representation of another illustrative embodiment of this invention for generating a function $f(t)=dt^3$.

When it is desired to generate this function in time sequence an initiating pulse source 20 is operated, applying an initiating pulse to a word generator 21 and a scan pulse generator 22. The initiating pulse source 20 may be a manually controlled key or switch. The word generator 21, further described below with reference to FIG. 5, generates a series of words corresponding to the coefficients of the variable in the function together with any compensating or difference factors that may be requisite for higher order functions, as discussed further below with reference to FIGS. 2, 3 and 4. In this embodiment the compensating factors are all unity and may be ignored. The scan pulse generator may be a frequency divider of the type disclosed in my Patent No. 2,888,557, issued May 26, 1959, for generating a pulse at constant intervals. The scan pulse generator is employed to allow the function to be present at the output of the function generator at only constantly occurring intervals corresponding to an idealized physical motion of the radar antenna in scanning the sky; accordingly as the radar would only pick up the aircraft in its flight once or, at most, a few times each revolution of the antenna and obtain sample information once or, at most, a few times each revolution, the generation of the function is not continuous but interrupted so as to correspond to the physical conditions of the radar computer being tested. The output of the scan pulse generator is applied to a number of gate circuits 24 for this purpose and these gate circuits will not be referred to again in the discussion of the operation of the specific embodiment depicted in FIG. 1.

The output of the word generator 21 comprises three trains of pulses representing, in binary form, the numbers 51, −20, and 2. Advantageously the minus sign is accommodated in the binary arithmetic; thus in one embodiment, wherein a word comprises fifteen digits, all numbers are represented as fractions less than one and a sixteenth digit is utilized as an indication of whether the fraction represented is positive or negative. The binary number representing a negative value is advantageously the complement of the positive number representing that value and has the opposite indicating digit; in one algorithm a binary "0" is utilized for positive numbers and a binary "1" for negative numbers. The "0" or "1" therefore represents the sign of the binary number.

As the first term of the desired output function is constant and not variable in time, the output $a=51$ of the word generator is applied directly to a first summing binary adder 26. The second output, $b=-20$, of the word generator is applied through an accumulator circuit 27 to the binary adder 26. An accumulator circuit in accordance with an aspect of this invention comprises a binary adder circuit 29 and a delay line 30 of one word length, i.e., in this embodiment, sixteen digits long. The output of the delay line is applied as a second input to the binary adder so that the output of the accumulator circuit is always the sum of the present and past inputs thereto. That this circuitry attains the function $f(t)=bt$ can be seen from the following table:

| time t | lead 32 | lead 33 | lead 34 |
|---|---|---|---|
| 0 | b | 0 | 0 |
| 1 | b | b | b |
| 2 | b | 2b | 2b |
| 3 | b | 3b | 3b, etc. | where leads 32, 33, and 34 are as indicated in the drawing.

The third coefficient generated by the word generator, $c=2$, is applied to a first accumulator circuit 36, similar to accumulator circuit 27 in its operation, and to a second accumulator circuit 37. Two outputs are taken from this accumulator circuit and summed in a binary adder 43, the two outputs representing the differences being summed to determine the terms of the series representing the desired order of power of the variable $t$. This can be seen from the following table:

| time t | lead 38 | lead 39 | lead 40 | lead 41 |
|---|---|---|---|---|
| 0 | 0 | 0 | 0 | 0 |
| 1 | c | 0 | c | c |
| 2 | 2c | c | 3c | 4c |
| 3 | 3c | 3c | 6c | 9c |
| 4 | 4c | 6c | 10c | 16c |
| 5 | 5c | 10c | 15c | 25c, etc. |

It is therefore apparent that at lead 41 of the binary adder 43 appears the function $f(t)=ct^2$; this output is applied together with the output of the first summing adder 26 to a second summing adder circuit 45, the output of which is the desired function.

As mentioned above, it is often necessary for the word generator to generate not only the desired coefficients of the terms of the function but also compensating or difference factors. This can be seen from consideration of FIG. 2 where another specific embodiment of this invention is depicted comprising a function generator for generating the function $f(t)=dt^3$. In this embodiment the word generator generates the word $1d$ once and applies it to the circuit which comprises three accumulators 52, 53, and 54 and an OR circuit 55. The operation of this circuit in generating the function $f(t)=dt^3$ can be seen from the following table:

| time t | lead 57 | lead 58 | lead 59 | lead 60 | lead 61 | lead 62 | lead 63 | lead 64 |
|---|---|---|---|---|---|---|---|---|
| 0 | 6 | 6 | 0 | 1 | 1 | 1 | 0 | 0 |
| 1 | 6 | 12 | 6 | 0 | 6 | 7 | 1 | 1 |
| 2 | 6 | 18 | 12 | 0 | 12 | 19 | 7 | 8 |
| 3 | 6 | 24 | 18 | 0 | 18 | 37 | 19 | 27 |
| 4 | 6 | 30 | 24 | 0 | 24 | 61 | 37 | 64 |
| 5 | 6 | 36 | 30 | 0 | 30 | 91 | 61 | 125, etc. |

As can be seen, the output appearing on lead 64 is a series representing the value $f(t)=t^3$, the coefficient $d$ having been omitted from the table. Actually the coefficient $d$ can be considered as adjacent each figure in the table, as indicated in the prior tables.

The choice of the compensation or difference value "6" depends on the fact that the accumulator circuits are summing the differences between the elements in the series expression of $f(t)=t^3$. If we write the series $f(t)=t^3$ as follows:

$$0 \quad 1 \quad 8 \quad 27 \quad 64 \quad 125, \text{etc.} \qquad (7)$$

we can write the first and higher differences between elements, as follows:

$$1 \quad 7 \quad 19 \quad 37 \quad 61 \qquad (8)$$
$$6 \quad 12 \quad 18 \quad 24 \qquad (9)$$
$$6 \quad 6 \quad 6 \qquad (10)$$

From row (10) we see that the ultimate difference is "6," which is the value of the primary compensating or difference factor to be provided by the word generator. The primary compensating or difference factor is always $n!$ where $n$ is the power of the function being generated.

For still higher powers of $t$ the compensating factors appear more complex, but the basic theory and the employment of the accumulators is as described above. Thus if we write the series $f(t) = t^4$:

$$0 \quad 1 \quad 16 \quad 81 \quad 256 \quad 625 \quad 1296 \quad \quad (11)$$

we can write the differences as follows:

$$1 \quad 15 \quad 65 \quad 175 \quad 369 \quad 671 \quad (12)$$
$$14 \quad 50 \quad 110 \quad 194 \quad 302 \quad (13)$$
$$36 \quad 60 \quad 84 \quad 108 \quad (14)$$
$$24 \quad 24 \quad 24 \quad (15)$$

This indicates that the primary compensating factor to be supplied in binary form by the word generator is "24" and the secondary compensating factors are "36," "14," and "1," these being the first terms of the successive series defined by taking the differences between successive terms of the series expression for the function. As discussed below, these compensating factors may be applied either singly or repetitively in different embodiments or may be broken down to components which are applied to the circuit. Thus, in the embodiment of FIG. 2, where the factor "6" was both the primary compensating factor and a secondary compensating factor, it needed to be applied only once to the circuit, as the circuit has memory or storage capacity itself to add in again the same factor applied to it once.

Figure 3:
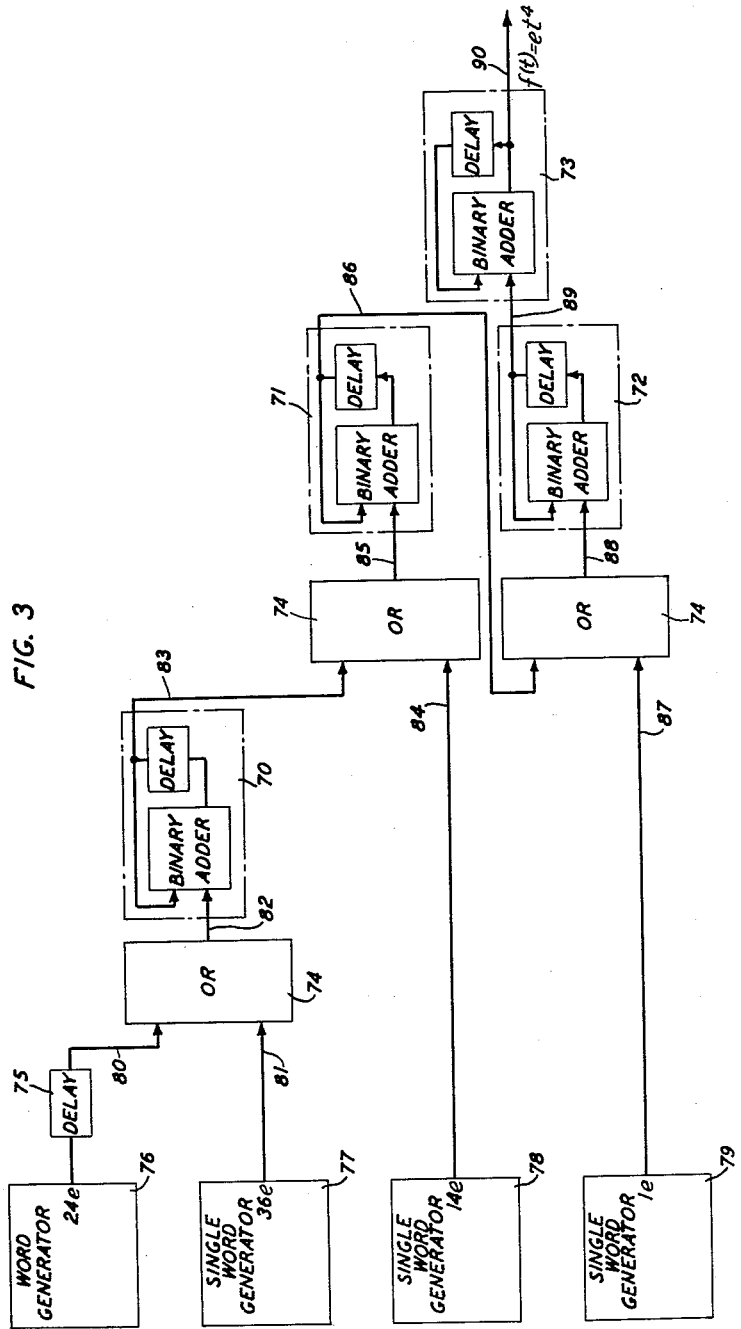
FIGS. 3 and 4 are block diagram representations of two specific embodiments of this invention for generating a function $f(t)=et^4$.
Figure 4:
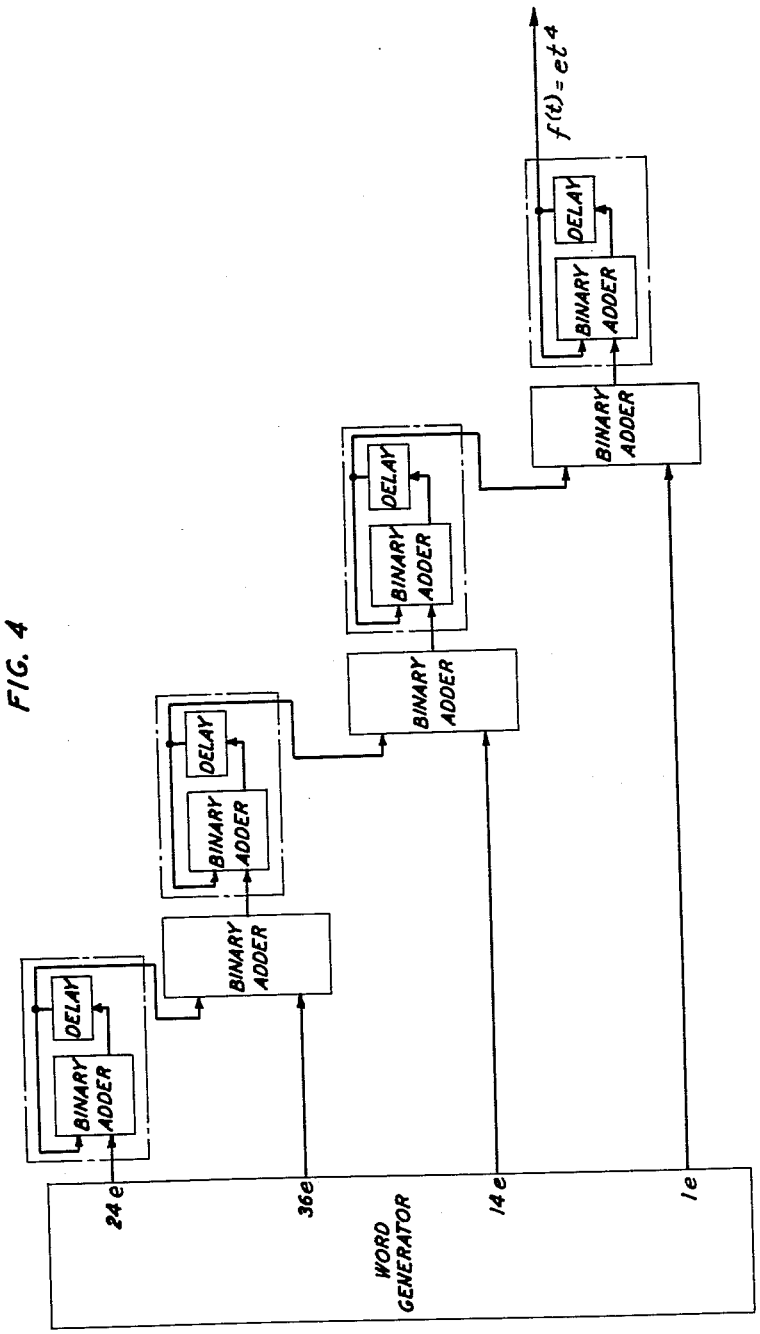

One circuit embodiment for attaining the function $f(t) = et^4$ is depicted in FIG. 3 and comprises four accumulator circuits 70, 71, 72, and 73, the number of accumulator circuits corresponding to the power of the variable in the function being generated, three OR circuits 74, and a one word delay circuit 75. To this circuit is continuously applied the value $24e$ from a word generator circuit 76 and the values $36e$, $14e$, and $1e$ from single word generator circuits 77, 78, and 79. The following table describes the operation of this circuit:

| time $t$ | lead 80 | lead 81 | lead 82 | lead 83 | lead 84 | lead 85 | lead 86 | lead 87 | lead 88 | lead 89 | lead 90 |
|---|---|---|---|---|---|---|---|---|---|---|---|
| 0 | 0 | 36 | 36 | 0 | 14 | 14 | 0 | 1 | 1 | 0 | 0 |
| 1 | 24 | 0 | 24 | 36 | 0 | 36 | 14 | 0 | 14 | 1 | 1 |
| 2 | 24 | 0 | 24 | 60 | 0 | 60 | 50 | 0 | 50 | 15 | 16 |
| 3 | 24 | 0 | 24 | 84 | 0 | 84 | 110 | 0 | 110 | 65 | 81 |
| 4 | 24 | 0 | 24 | 108 | 0 | 108 | 194 | 0 | 194 | 175 | 256 |
| 5 | 24 | 0 | 24 | 132 | 0 | 132 | 302 | 0 | 302 | 369 | 625 |
| 6 | 24 | 0 | 24 | 156 | 0 | 156 | 434 | 0 | 434 | 671 | 1,296 |

From this it can be seen that the output on lead 90 is the series representing the function $f(t) = et^4$, the coefficient $e$ having been applied by the word generator with each compensating factor. The manner in which this circuit takes the summation of differences to attain the function can readily be seen by comparing the values appearing on leads 83, 86, and 89 with lines (14), (13), and (12), respectively, of the difference series given above. In other specific embodiments wherein modifications are made to make more efficient use of equipment, to simplify the circuit, and to utilized as much as possible the least expensive circuit components, this parallelism may not be as obvious.

Figure 5:
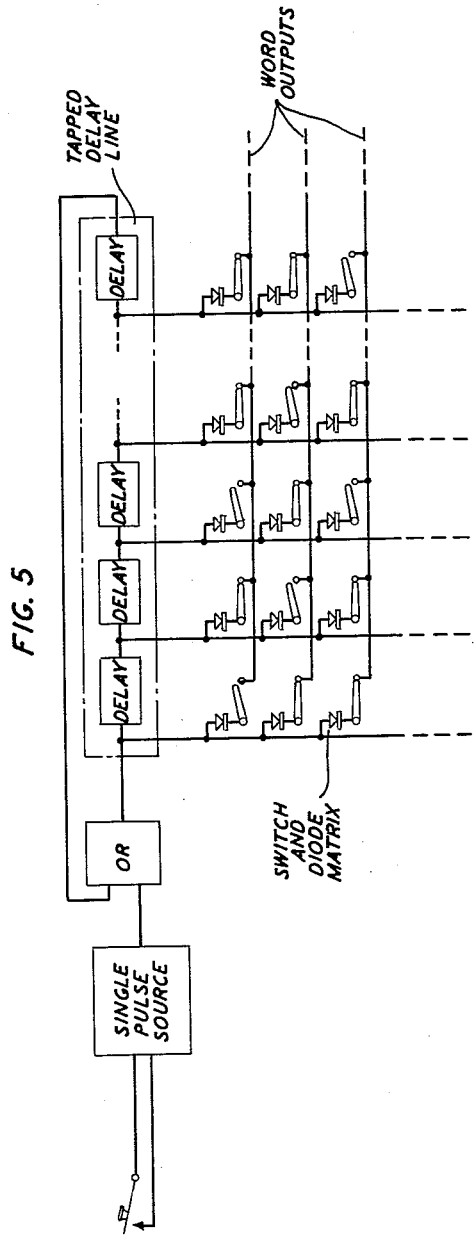
FIG. 5 is a block diagram representation of a word generator that may be employed in embodiments of this invention.

It is therefore to be understood that the above circuits are only exemplary of a large number of possible embodiments utilizing accumulators to take the sum of the differences of successive series to attain the desired function, the number of accumulators being equal to the power of the function being generated. The embodiment of FIG. 3 utilizes a number of single word generators together with OR circuits to apply the desired compensating factors to the function generator, the accumulator remembering the compensating factor in subsequent internal computations. However, only word generators which repetitively supply the compensating or difference factors may be utilized; FIG. 5 is a block diagram of another specific embodiment wherein the word generators repetitively apply the compensating factors to binary adders where they are added to the output of the accumulator circuits. Further, because of the inherent memory and storage capacities of the accumulators, the compensation factors may be broken down to their components and the components applied to the function generator. Thus in generating the function $f(t) = et^4$, compensating factors 24 and 36 were both employed; in place of the factor 36, the component factors 24 and 12 can be employed and since the factor 24 is already being applied to the circuit, the factor 12 can be applied in place of the factor 36 with a slight change in the generator circuitry. Similarly, if desired, the factor 12 could be applied in lieu of the factor 24, with an appropriate change of circuitry.

FIG. 5 depicts a block digaram representation of one particular word generator that may be employed in embodiments of this invention. As there seen, the word generator comprises a single pulse source which applies an initiating pulse, through an OR circuit, to a tapped delay line, the total delay of each individual section of the delay line being one digit. The taps from the delay line are connected to a switch and diode matrix; by appropriate choice of the switches closed to any horizontal lead, any word can be generated on that lead.

In all of the above discussion it has been assumed that perfect circuit components are available, i.e., components having no inherent delay or loss. In fact, of course, such circuit components as binary adders do have both delay and loss. It is therefore to be understood that the delay of the various delay lines is adjusted to account for the inherent delay of other units; thus the delay of the delay line of each accumulator will be less than the time for one word by the amount of the delay of the binary adder of that accumulator. Similarly it is to be understood that pulse amplifiers are advantageously employed to compensate for inherent losses in the circuit elements. Transistor pulse regenerative amplifiers, such as disclosed in Patent No. 2,802,118, issued August 6, 1957, of Q. W. Simkins, and in applications Serial No. 437,458, of J. H. Felker, and Serial No. 437,401, of J. H. Vogelsong, both filed June 17, 1954, may advantageously be employed. Further to assure proper timing of operation of the various components it is desirable that function generator circuits in accordance with the invention be synchronous with a suitable clock frequency source applied for timing purposes, as described in the above-mentioned Schneider, and Simkins patents and Felker and Vogelsong applications.

While specific embodiments of this invention have been disclosed to illustrate the employment of accumulator circuits for function generation, it is to be understood that a great many other arrangements may be devised without departing from the spirit and scope of the invention. Thus the arrangements of the delay line, the choice of compensating factors, the utilization of repetitive or single word generators, and the utilization of combinations of other components all may be varied and modified by those skilled in the art.

What is claimed is:

1. A circuit for generating functions of the form $f(t) = a + bt + ct^2 + dt^3 \ldots + xt^n$ comprising means for generating trains of pulses representing the coefficients $a, b, c, d \ldots x$ required by a particular function, means for generating each of the powers of the variable comprising a plurality of accumulator circuits, each of said accumulator circuits comprising an adder circuit and a delay circuit connected between the output of the adder circuit and the input thereof, the number of said accumulator circuits employed for the generation of a particular power of the variable being equal to the power of that variable, and means for applying each of said pulse trains to the means for generating the corresponding power of the variable.

2. A circuit for generating a function of the form $f(t)=xt^n$ comprising a plurality of accumulator circuits, each of said accumulator circuits comprising an adder circuit and a delay circuit connected between the output of said adder circuit and the input thereof, the number of said accumulator circuits being equal to the power of the variable, means for generating trains of pulses, a first one of said trains of pulses corresponding to the coefficient $x$ times $n!$, and means for applying said pulse trains to specific ones of said accumulator circuits.

3. A circuit for generating a function in accordance with claim 2 wherein said means for generating pulse trains includes means for generating said first pulse train repetitively and the remainder of said pulse trains a single time further comprising a plurality of OR circuits for applying the output of a prior accumulator circuit and a pulse train to a subsequent accumulator circuit.

4. A circuit for generating a function in accordance with claim 2 wherein said means for generating pulse trains comprises means for generating said pulse trains repetitively further comprising a plurality of binary adder circuits, means applying the output of a prior accumulator circuit and a pulse train to a binary adder circuit, and means for applying the output of said binary adder circuit to a subsequent accumulator circuit.

5. A circuit for generating a function of the form $f(t)=xt^n$ comprising a plurality of accumulator circuits, each of said accumulator circuits comprising an adder circuit and a delay circuit between the output of said adder circuit and the input thereof, and means applying pulse trains to each of said accumulator circuits whereby each successive accumulator circuit generates a series corresponding to the series of differences between successive terms of the next higher series, the number of accumulators corresponding to the power of the variable being generated.

6. A circuit for generating a function in accordance with claim 5 wherein said means applying pulse trains to said accumulator circuits comprises means for generating trains of pulses, a first one of said trains of pulses representing the coefficient $x$ times $n!$, and means for applying each of said trains of pulses to different ones of said accumulators.

7. A circuit in accordance with claim 6 wherein said generating means includes means for generating said first train of pulses repetitively and the remaining pulse trains at only one time.

No references cited.